Sept. 15, 1931.    W. N. COBB    1,823,240

ROTATING SPHERICAL BEACON

Filed April 19, 1928

Inventor:
Windsor N. Cobb
by
Atty

Patented Sept. 15, 1931

1,823,240

UNITED STATES PATENT OFFICE

WINDSOR N. COBB, OF SAN FRANCISCO, CALIFORNIA

ROTATING SPHERICAL BEACON

Application filed April 19, 1928. Serial No. 271,253.

My invention relates to spherical, illuminable beacons.

The object of my invention is to provide a spherical beacon or similar device adapted to reflect sunlight or to be illuminated by a light thrown against the same from an exterior source, and further adapted to attract attention by the beams of light reflected from its surface to take the eye of an observer from any possible angle whether he be in the air or on the ground, whether near by or at a distance.

My device may further be used for advertising purposes, also to attract attention to a particular place or building, for example as a private land mark; or to mark a golf course or flying field or country club located among open rolling hills; also as a marine beacon for use on buoys, piers or vessels.

A further object of my invention is to provide an illuminable beacon and the like, of simple construction.

I attain my object by a device comprising, in combination, a support, a spherical unitary body mounted for rotation on said support, and means for rotating the spherical body; the surface of the spherical body being provided with contiguous light reflecting facets having common perimeter segments, preferably of small area and geometric form, said facets being arranged in circles on the spherical body whose planes are inclined at an oblique angle with the axis of rotation of the spherical body, so that the rotation of the spherical body will cause the beams of light reflected from certain facets of its surface to catch the eye of an observer, appearing as a frequently repeated flash, or in case of rapid rotation, as a fixed light.

The details of construction and other incidental features of my invention are hereinafter described with reference to the accompanying drawings, in which.

Figure 1:
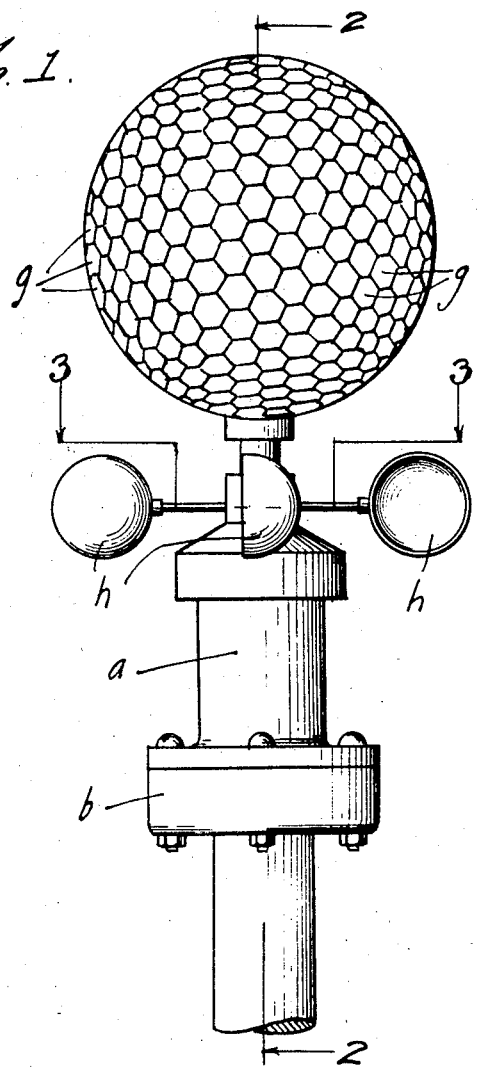
Fig. 1 shows a front elevation of my rotating beacon and illustrates the details thereof.
Figure 2:
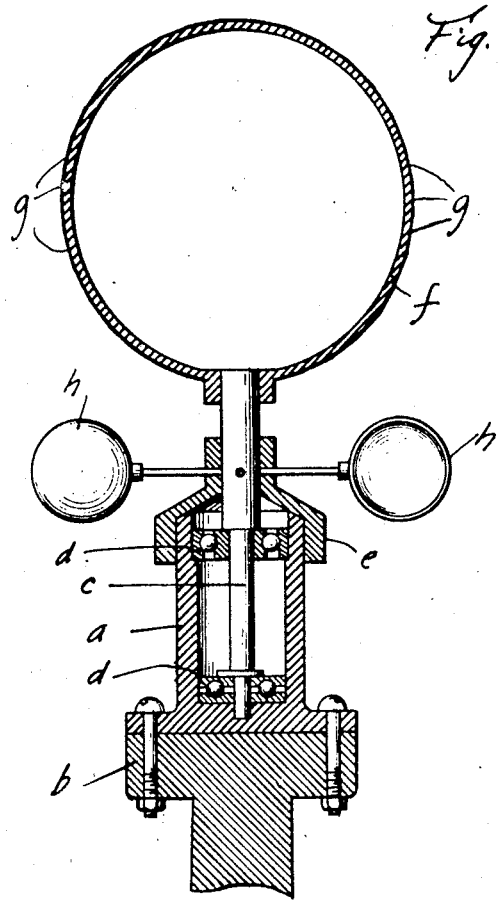
Fig. 2 shows a section taken on the line 2—2 of Fig. 1 and illustrates further details of construction.
Figure 3:
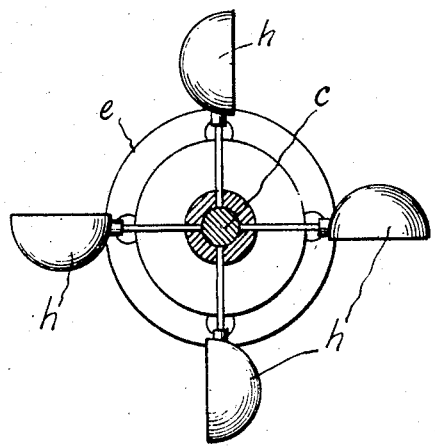
Fig. 3 shows a section taken on the line 3—3 of Fig. 1 and illustrates further details of construction.
Figure 4:
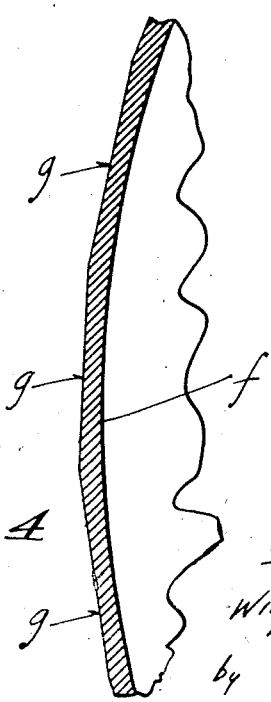
Fig. 4 shows an enlarged fragmentary sectional portion of my beacon as shown in Fig. 2 and illustrates the relative angularity of the facts.

Referring now to the figures, my invention comprises a housing $a$ adapted to be mounted on the top of a pole or the like by means of a suitable base $b$ to which it is fastened.

An upright shaft $c$ is mounted for rotation on suitable antifriction bearings $d$, and a cap $e$ closing the upper end of the housing is fixed to the said shaft.

On the upper end of the shaft $c$ is fixed a spherical body $f$ preferably hollow for lightness. The spherical surface is formed of a large number of contiguous polyhedral faces or facets $g$ having common perimeter segments arranged in parallel circles, whose planes are inclined at approximately 10 degrees from the axis of rotation of the spherical body $f$.

As shown in the drawings, wind cups $h$ are provided, mounted on the cap $e$ to provide the driving force for rotating the spherical body, but an electric motor or other means may as well be provided.

By this arrangement and construction rays of light, either from the sun or suitable artificial sources will be reflected from each facet, successively as it is brought into the line of the observer's vision giving the effect of a flashing or scintillating beacon.

Further, by arranging the facets in parallel circles, whose planes are inclined to the vertical axis of rotation of the sphere the facets of adjacent rings will come successively within the line of vision, and the number of angles at which the rays of light will be reflected are increased, so no matter what the observer's relative position to the beacon may be he will always be in the angle of reflection from a number of facets successively.

In other words, beams of light will be continuously reflected in inclined planes, which will sweep across all points on the observer's horizon, so that no matter what the position of the observer, whether above or below the beacon, he will be within the reflective angles of the beacon instead of possibly between them, as would be the case were the beams of light reflected in horizontal planes parallel with the horizon.

Thus, my beacon may be effectively used as a land marker for observers above the horizon as well as below, as in the case of an aviator, a ship at sea, or a traveler on land, and by the substitution of an artificial source of light of sufficient strength, my beacon can be used during the night as well as the day and will appear as a distant point of light for the purposes described.

I claim:

In a beacon light of the character described comprising, a unitary spherical rotatable body whose surface bears contiguous polyhedral plane light reflecting facets having common perimeter segments, and the said facets lying in parallel circles whose planes are inclined at an oblique angle with its vertical axis, whereby when the spherical body is rotated light beams will be reflected therefrom continuously in inclined planes sweeping across all points on the horizon.

WINDSOR N. COBB.